United States Patent
Rostami et al.

(10) Patent No.: US 11,448,753 B2
(45) Date of Patent: Sep. 20, 2022

(54) SYSTEM AND METHOD FOR TRANSFERRING ELECTRO-OPTICAL (EO) KNOWLEDGE FOR SYNTHETIC-APERTURE-RADAR (SAR)-BASED OBJECT DETECTION

(71) Applicant: HRL Laboratories, LLC, Malibu, CA (US)

(72) Inventors: Mohammad Rostami, Los Angeles, CA (US); Soheil Kolouri, Agoura Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 309 days.

(21) Appl. No.: 16/752,527

(22) Filed: Jan. 24, 2020

(65) Prior Publication Data
US 2020/0264300 A1    Aug. 20, 2020

Related U.S. Application Data

(60) Provisional application No. 62/817,720, filed on Mar. 13, 2019, provisional application No. 62/817,403, (Continued)

(51) Int. Cl.
*G01S 13/90*     (2006.01)
*G06T 7/73*      (2017.01)
*G01S 13/86*     (2006.01)

(52) U.S. Cl.
CPC ........ *G01S 13/9027* (2019.05); *G01S 13/867* (2013.01); *G06T 7/74* (2017.01); (Continued)

(58) Field of Classification Search
CPC ..... G01S 13/9027; G01S 13/867; G06T 7/74; G06T 2207/10044; G06T 2207/20081; G06T 2207/20084
See application file for complete search history.

(56) References Cited

U.S. PATENT DOCUMENTS

| | | | |
|---|---|---|---|
| 2016/0019458 A1* | 1/2016 | Kaufhold | G01S 13/90 342/25 F |
| 2021/0056343 A1* | 2/2021 | Toizumi | G06K 9/627 |

OTHER PUBLICATIONS

L. H. Hughes, M. Schmitt and X. X. Zhu, "Generative Adversarial Networks for Hard Negative Mining in CNN-Based SAR-Optical Image Matching," IGARSS 2018—2018 IEEE International Geoscience and Remote Sensing Symposium, 2018, pp. 4391-4394, doi: 10.1109/IGARSS.2018.8517355. (Year: 2018).*

(Continued)

*Primary Examiner* — Vladimir Magloire
*Assistant Examiner* — Nazra Nur Waheed
(74) *Attorney, Agent, or Firm* — Tope-McKay & Associates

(57) ABSTRACT

Described is a system for transferring learned knowledge from an electro-optical (EO) domain to a synthetic-aperture-radar (SAR) domain. The system uses a measured similarity between the EO domain and the SAR domain to train a model for classifying SAR images using knowledge previously learned from the electro-optical (EO) domain. Using the trained model, a SAR image is processed to determine regions of interest in the SAR image. A region of interest is classified to determine whether the region of interest corresponds to an object of interest, and classified regions of interest that contain the object of interest are output. The object of interest is displayed on a visualization map, and the visualization map is automatically updated to reflect a change in position of the object of interest.

18 Claims, 9 Drawing Sheets

Trained knowledge in EO

300

Knowledge transferred

304

Knowledge used in SAR

302

Related U.S. Application Data filed on Mar. 12, 2019, provisional application No. 62/807,716, filed on Feb. 19, 2019.

(52) U.S. Cl.
CPC .............. *G06T 2207/10044* (2013.01); *G06T 2207/20081* (2013.01); *G06T 2207/20084* (2013.01)

(56) References Cited

OTHER PUBLICATIONS

Dimitrios Marmanis et al: "Artificial Generation of Big Data for Improving Image Classification: A Generative Adversarial Network Approach on SAR Data", Nov. 6, 2017 (Year: 2017).*
J. Rabin, G. Peyr'e, J. Delon, and M. Bernot. Wasserstein barycenter and its application to texture mixing. In International Conference on Scale Space and Variational Methods in Computer Vision, pp. 435-446. Springer, 2011 (Year: 2011).*
R. Hansch, O. Hellwich and X. Tu, "Machine-learning based detection of corresponding interest points in optical and SAR images," 2016 IEEE International Geoscience and Remote Sensing Symposium (IGARSS), 2016, pp. 1492-1495, doi: 10.1109/IGARSS. 2016.7729381. (Year: 2016).*
Notification of Transmittal, the International Search Report, and the Written Opinion of the International Searching Authority for PCT/US2020/015105; dated May 20, 2020.
Dimitrios Marmanis et al: "Artificial Generation of Big Data for Improving Image Classification: A Generative Adversarial Network Approach on SAR Data", Nov. 6, 2017 (Nov. 6, 2017), XP055692418, Retrieved from the Internet: URL:https://arxiv.org/pdf/1711.02010.pdf [retrieved on May 4, 2020].
Chen Sizhe et al: "Target Classification Using the Deep Convolutional Networks for SAR Images", IEEE Transactions on Geoscience and Remote Sensing, IEEE Service Center, Piscataway, NJ, US, vol. 54, No. 8, Aug. 1, 2016 (Aug. 1, 2016), pp. 4806-4817, XP011612535 , ISSN : 0196-2892, DOI: 10.1109/TGRS .2016 .2551720 [retrieved on Jun. 1, 2016].
Nicolas Bonneel, Julien Rabin, Gabriel Peyre', and Hanspeter Pfister. Sliced and Radon Wasserstein barycenters of measures Journal of Mathematical Imaging and Vision, 51(1): pp. 22-45, 2015.
Mathieu Carriere, Marco Cuturi, and Steve Oudot. Sliced wasserstein kernel for persistence diagrams. arXiv preprint arXiv:1706.03358, pp. 1-20, 2017.
S. Chen, H. Wang, F. Xu, and Y. Jin. Target classification using the deep convolutional networks for SAR images. IEEE Trans, on Geo. and Remote Sens., 54(8): pp. 4806-4817, 2016.
M. Courty, R. Flamary, D. Tuia, and A. Rakotomamonjy. Optimal transport for domain adaptation. IEEE TPAMI, 39(9) pp. 1853-1865, 2017.
B. Damodaran, B. Kellenberger, R. Flamary, D. Tuia, and N. Courty. Deepjdot: Deep joint distribution optimal transport for unsupervised domain adaptation. arXiv preprint arXiv:1803.10081, pp. 1-17, 2018.
H. Daume' III. Frustratingly easy domain adaptation. arXiv preprint arXiv:0907.1815, pp. 1-9, 2009.
Hal Daume III and Daniel Marcu. Domain adaptation for statistical classifiers. Journal of artificial Intelligence research, 26: pp. 101-126, 2006.
I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pp. 2672-2680, 2014.
Arthur Gretton, Alex Smola, Jiayuan Huang, Marcel Schmittfull, Karsten Borgwardt, and Bernhard Scholkopf. Covariate shift by kernel mean matching. Dataset shift in machine learning, 3(4):5, pp. 1-38, 2009.
R. Hammell. Ships in satellite imagery, 2017. Data retrieved from Kaggle at h t t p s : / / w w w. kaggle.com/rhammell/ships-in-satellite-imagery Downloaded Jan. 28, 2020.
Z. Huang, Z. Pan, and B. Lei. Transfer learning with deep convolutional neural network for sar target classification with limited labeled data. Remote Sensing, 9(9):907, pp. 1-21, 2017.
Diederik P Kingma and Jimmy Ba. Adam: A method for stochastic optimization. arXiv preprint arXiv:1412.6980, pp. 1-15, 2014.
E. Kodirov, T. Xiang, Z. Fu, and S. Gong. Unsupervised domain adaptation for zero-shot learning. In Proceedings of the IEEE International Conference on Computer Vision, pp. 2452-2460, 2015.
Soheil Kolouri, Se Rim Park, Matthew Thorpe, Dejan Slepcev, and Gustavo K Rohde. Optimal mass transport: Signal processing and machine-learning applications. IEEE Signal Processing Magazine, 34(4): pp. 43-59, 2017.
Soheil Kolouri, Philip E Pope, Charles E Martin, and Gustavo K Rohde. Sliced-wasserstein auto-encoders. International Conference on Learning Representation (ICLR), pp. 1-19, 2019.
Soheil Kolouri, Gustavo K Rohde, and Heiko Hoffman. Sliced Wasserstein distance for learning Gaussian mixture models. In IEEE Conference on Computer Vision and Pattern Recognition, pp. 3427-3436, 2018.
Soheil Kolouri, Yang Zou, and Gustavo K Rohde. Sliced wasserstein kernels for probability distributions. In Proceedings of the IEEE Conference on Computer Vision and Pattern Recognition, pp. 5258-5267, 2016.
V. Koo, Y. Chan, G. Vetharatnam, M. Y. Chua, C. Lim, C. Lim, C. Thum, T. Lim, Z. bin Ahmad, K. Mahmood, et al. A new unmanned aerial vehicle synthetic aperture radar for environmental monitoring. Progress in Electromagnetics Research, 122: pp. 245-268, 2012.
Haitao Lang, Siwen Wu, and Yongjie Xu. Ship classification in sar images improved by ais knowledge transfer. IEEE Geoscience and Remote Sensing Letters, 15(3): pp. 439-443, 2018.
Mingsheng Long, JianminWang, Guiguang Ding, Jiaguang Sun, and Philip S Yu. Transfer joint matching for unsupervised domain adaptation. In Proceedings of the IEEE conference on computer vision and pattern recognition, pp. 1410-1417, 2014.
D. Malmgren-Hansen, A. Kusk, J. Dall, A. Nielsen, R. Engholm, and H. Skriver. Improving sar automatic target recognition models with transfer learning from simulated data. IEEE Geoscience and Remote Sensing Letters, 14(9) pp. 1484-1488, 2017.
Leland McInnes, John Healy, and James Melville. Umap: Uniform manifold approximation and projection for dimension reduction. arXiv preprint arXiv:1802.03426, pp. 1-51, 2018.
J. Rabin, G. Peyr'e, J. Delon, and M. Bernot. Wasserstein barycenter and its application to texture mixing. In International Conference on Scale Space and Variational Methods in Computer Vision, pp. 435-446. Springer, 2011.
Julien Rabin, Gabriel Peyr'e, Julie Delon, and Marc Bernot. Wasserstein barycenter and its application to texture mixing. In International Conference on Scale Space and Variational Methods in Computer Vision, pp. 435-446. Springer, 2011.
A. Redko, Land Habrard and M. Sebban. Theoretical analysis of domain adaptation with optimal transport. In Joint European Conference on Machine Learning and Knowledge Discovery in Databases, pp. 737-753. Springer, 2017.
K. Saenko, B. Kulis, M. Fritz, and T. Darrell. Adapting visual category models to new domains. In European conference an computer vision, pp. 213-226. Springer, 2010.
C. Schwegmann, W. Kleynhans, B. Salmon, L. Mdakane, and R. Meyer. Very deep learning for ship discrimination in synthetic aperture radar imagery. In IEEE International Geo. and Remote Sensing Symposium, pp. 104-107, 2016.
Ronghua Shang, Jiaming Wang, Licheng Jiao, Rustam Stolkin, Biao Hou, and Yangyang Li. Sar targets classification based on deep memory convolution neural networks and transfer parameters. IEEE Journal of Selected Topics in Applied Earth Observations and Remote Sensing, 11(8): pp. 2834-2846, 2018.
Z. Wang, L. Du, J. Mao, B. Liu, and D. Yang. Sar target detection based on ssd with data augmentation and transfer learning. IEEE Geoscience and Remote Sensing Letters, pp. 150-154, 2018.

(56) References Cited

OTHER PUBLICATIONS

Jia Zhang, D., W. Heng, K. Ren, and J. Song. Transfer learning with convolutional neural networks for SAR ship recognition. In IOP Conference Series: Materials Science and Engineering, vol. 322, p. 072001. IOP Publishing, 2018.
Pan, S.J. and Yang, Q., A survey on transfer learning. IEEE Transactions on knowledge and data engineering, 22(10), pp. 1345-1359, 2010.
Motiian S, Jones Q, Iranmanesh S, Doretto G. Few-Shot Adversarial Domain Adaptation, In Advances in Neural Information Processing Systems, pp. 6673-6683, 2017.
Luo, Z., Zou, Y., Hoffman, J. and Fei-Fei, L.F., Label Efficient Learning of Transferable Representations Across Domains and Tasks. In Advances in Neural Information Processing Systems, pp. 164-176, 2017.
Murez, Z., Kolouri, S., Kriegman, D., Ramamoorthi, R. and Kim, K., Image to Image Translation for Domain Adaptation CVPR 2018, 2017, pp. 4500-4509.
Hagan, M.T. and Menhaj, M.B., Training feedforward networks with the Marquardt algorithm. IEEE transactions on Neural Networks, 5(6), pp. 989-993, 1994.
Arjovsky, M., Chintala, S. and Bottou, L., Wasserstein gan. arXiv preprint arXiv:1701.07875, pp. 1-32, 2017.
Kolouri, S., Rohde, G.K. and Hoffman, H., Sliced Wasserstein Distance for Learning Gaussian Mixture Models. CVPR 2018, pp. 3427-3436, 2017.
Kolouri, S., Martin, C.E. and Rohde, G.K., Sliced-Wasserstein Autoencoder: An Embarrassingly Simple Generative Model arXiv preprint arXiv:1804.01947, pp. 1-25, 2018.
Sankaranarayanan, S., Balaji, Y., Castillo, C. D., and Chellappa, R., Generate to adapt Aligning domains using generative adversarial networks In CVPR, pp. 8503-8512, 2018.
Liu, M., and Tuzel, O., Coupled generative adversarial networks. In Advances in neural information processing systems, pp. 469-477, 2016.
Tzeng, E., Hoffman, J., Saenko, K., and Darrell, T., Adversarial discriminative domain adaptation. In Computer Vision and Pattern Recognition (CVPR), vol. 1, 4, pp. 2962-2971, 2017.
Hoffman, J., Tzeng, E., Park, T., Zhu, J., Isola, P., Saenko, K., Efros, A. A., and Darrell, T., Cycada: Cycle-consistent adversarial domain adaptation. In ICML, pp. 1-10, 2018.
Ganin, Y., and Lempitsky, V., Unsupervised domain adaptation by backpropagation. In ICML, pp. 1-10, 2014.
Ghifary, M., Kleijn, W. B., Zhang, M., Balduzzi, D., and Li, W., Deep reconstruction-classification networks for unsupervised domain adaptation. In European Conference on Computer Vision, pp. 597-613, 2016.
Saito, K., Ushiku, Y., and Harada, T., Asymmetric tri-training for unsupervised domain adaptation. In ICML, pp. 1-10, 2018.
Courty, N., Flamary, R., Tuia, D., and Rakotomamonjy, A., Optimal transport for domain adaptation. IEEE TPAMI 39 (9): pp. 1853-1865, 2017.
Seguy, V., Damodaran, B. B., Flamary, R., Courty, N., Rolet, A., and Blondel, M., Large-scale optimal transport and napping estimation. In ICLR, pp. 1-15, 2018.
Gabourie, A., Rostami, M., Pope, P., Kolouri, S., and Kim, K., Learning a domain-invariant embedding for unsupervised domain adaptation using class-conditioned distribution alignment. In 2019 57th Annual Allerton Conference on Communication, Control, and Computing, pp. 352-359, 2019.
Notification of Transmittal, the International Search Report, and the Written Opinion of the International Searching Authority for PCT/US2019/067259; dated Apr. 14, 2020.
Jaeyoon Yoo et al: "Domain Adaptation Using Adversarial Learning for Autonomous Navigation", arxiv.org, Cornell University Library, 201 Olin Library Cornell University Ithaca, NY 14853, Dec. 11, 2017 (Dec. 11, 2017), XP081320179, abstract; figure 1, 1. Introduction, 2.2 Domain Adaptation, 3. Method.
Zou Yang et al: "Unsupervised Domain Adaptation for Semantic Segmentation via Class-Balanced Self-training", Oct. 7, 2018 (Oct. 7, 2018), ROBOCUP 2008 : ROBOCUP 2008 : Robot Soccer World Cup XII; [Lecture Notes in Computer Science; Lect. Notes Computer], Springer, International Publishing, Cham, pp. 297-313, XP047498238, IS BN: 978-3-319-10403-4 [retrieved on Oct. 7, 2018] abstract; figure 1, 1. Introduction, 3. Preliminaries, 4. Proposed Method.
Notification of and the International Preliminary Report on Patentability Chapter II for PCT/US2020/015105; dated Apr. 14, 2021.
Claims for the International Preliminary Report on Patentability Chapter II for PCT/US2020/015105; dated Apr. 14, 2021.

\* cited by examiner

FIG. 6A The EO Domain (real labels)
FIG. 6B The SAR Domain (real labels)
FIG. 6C The EO Domain (predicted labels)
FIG. 6D The SAR Domain (labeled and unlabeled data)

The SAR Domain (real labels)

The SAR Domain (predicted labels)

The EO Domain (real labels)

The EO Domain (predicted labels)

SYSTEM AND METHOD FOR TRANSFERRING ELECTRO-OPTICAL (EO) KNOWLEDGE FOR SYNTHETIC-APERTURE-RADAR (SAR)-BASED OBJECT DETECTION

CROSS-REFERENCE TO RELATED APPLICATIONS

The present application is a Non-Provisional application of U.S. Provisional Application No. 62/817,403, filed in the United States on Mar. 12, 2019, entitled, "System and Method for Transferring EO Knowledge for SAR-Based Object Detection," the entirety of which is incorporated herein by reference.

The present application is also a Non-Provisional application of U.S. Provisional Application No. 62/817,720, filed in the United States on Mar. 13, 2019, entitled, "System and Method for Transferring EO Knowledge for SAR-Based Object Detection," the entirety of which is incorporated herein by reference.

The present application is also a Non-Provisional application of U.S. Provisional Application No. 62/807,716, filed in the U.S. on Feb. 19, 2019, entitled, "System and Method for Unsupervised Domain Adaptation Via Sliced-Wasserstein Distance," the entirety of which is incorporated herein by reference.

BACKGROUND OF INVENTION

(1) Field of Invention

The present invention relates to a system for transferring knowledge from the electro-optical (EO) domain to the synthetic-aperture-radar (SAR) domain, and more particularly, to a system for transferring knowledge from the EO domain to the SAR domain using a semi-supervised domain adaptation framework.

(2) Description of Related Art

Electro-Optical (EO) images are the dominant visual data that are collected and processed as input sensory data in computer vision applications for supervised learning. The state-of-the-art deep convolutional neural networks (CNNs) for object detection in autonomous systems are trained in a data-driven scheme using a huge labeled dataset of images to automatically learn high quality features for object detection. Despite wide range of applicability of EO imaging, in applications such as continuous environmental monitoring and large-scale surveillance (see Literature Reference No. 18) and earth remote sensing, which require imaging at extended time periods, EO imaging is not feasible. In these applications, using SAR imaging is inevitable, since SAR imaging can provide high-resolution images using the radar signals that can propagate in occluded weather and at night.

Generating a large labeled training dataset for SAR images is extremely challenging for the following reasons. Preparing devices for collecting SAR data solely for generating training datasets is much more expensive compared to EO datasets (see Literature Reference No. 21). SAR images are often classified data, making access to SAR data heavily regulated and limited. This limits the number of participants who can be hired to help with processing and labeling. Labeling SAR images typically needs trained experts, as opposed to tasks within the natural EO domain images (see Literature Reference No. 27). This makes labeling SAR data more expensive. Continuous collection of SAR data is common in SAR applications. This can make the labeled data unrepresentative of the current distribution, obligating persistent labeling for model retraining (see Literature Reference No. 11). Additionally, training a CNN using most existing SAR datasets leads to overfit models that do not generalize well on test sets (see Literature Reference Nos. 3 and 28).

Several prior works have applied the idea of transfer learning to the SAR domain. Huang et al. (see Literature Reference No. 11) address the problem of labeled data scarcity in the SAR domain via unsupervised learning. The idea is to use a large pool of unlabeled SAR data to train an autoencoder. As a result, the embedding space learned by the autoencoder is discriminative and can be used as a means for better feature extraction to benefit from knowledge transfer. The trained encoder sub-network can be concatenated with a classifier network and both would be fine-tuned using the labeled portion of data to map the data points to the label space. Hansen et al. (see Literature Reference No. 21) proposed to transfer knowledge using synthetic SAR images which are easy to generate. Their major novelty is to demonstrate how to generate a simulated dataset for a given SAR problem based on simulated object radar reflectivity. A CNN is then pretrained on the synthetic dataset and then used as an initialization for the real SAR domain problem. Due to the pretraining stage, the model can be fine-tuned using fewer real labeled data points.

Zhang et al. (see Literature Reference No. 30) proposed to transfer knowledge from a secondary source SAR task, where labeled data is available. Their idea is to pretrain a CNN on the task with labeled data and then fine-tune it on the target task. Lang et al. (see Literature Reference No. 19) used an automatic identification system (AIS) as the secondary domain for knowledge transfer. AIS is a tracking system for monitoring movement of ships that can provide labeling information. Shang et al. (see Literature Reference No. 28) amended a CNN with an information recorder. The recorder is used to store spatial features of labeled samples and the recorded features are used to predict labels of unlabeled data points based on spatial similarity to increase the number of labeled samples. Finally, Wang et al. (see Literature Reference No. 29) used an approach to transfer knowledge using VGGNet as a feature extractor in the learning pipeline, which itself has been trained on a large EO dataset. These past works mostly use a pretrained deep network that is trained using a secondary source of knowledge, which is then fine-tuned using few labeled data points on the target SAR task. Hence, knowledge transfer occurs as a result of selecting a better initial point using the secondary source.

Domain adaptation (DA) has been investigated in the computer vision literature for a broad range of scenarios. The goal is to learn a model on a source data distribution with sufficient data such that it generalizes well on a different, but related target data distribution with insufficient labeled data. Early DA algorithms either develop domain invariant and stable features, which can be used on both domains (see Literature Reference No. 6) or to learn a function to map the target data points into the source domain (see Literature Reference No. 26). Despite being very different solutions, both approaches try to preprocess data such that the distributions of both domains become similar after pre-processing. As a result, a classifier trained using the source data, can also be used on the target domain.

The existing methods that disclose transfer learning from EO to SAR address the challenge in the very few label (i.e., few-shot) scenario. The approaches have difficulties when only a few labeled SAR images are available and, moreover, are computationally expensive. Thus, a continuing need exists for a transfer learning system that leverages its learned knowledge in the EO domain to perform object detection in the SAR domain with only very few labeled data samples.

SUMMARY OF INVENTION

The present invention relates to a system for transferring knowledge from the electro-optical (EO) domain to the synthetic-aperture-radar (SAR) domain, and more particularly, to a system for transferring knowledge from the EO domain to the SAR domain using a semi-supervised domain adaptation framework. The system comprises one or more processors and a non-transitory computer-readable medium having executable instructions encoded thereon such that when executed, the one or more processors perform multiple operations. Using a measured similarity between the EO domain and the SAR domain, the system trains a model for classifying SAR images using knowledge previously learned from the electro-optical (EO) domain. Using the trained model, the system processes a SAR image to determine regions of interest in the SAR image. A region of interest is classified to determine whether the region of interest corresponds to an object of interest, and classified regions of interest that contain the object of interest are output. The object of interest is displayed on a visualization map, and the visualization map is automatically updated to reflect a change in position of the object of interest.

In another aspect, the model is trained with a set of labeled data points in the EO domain, and the trained model is adapted using a set of labeled data points in the SAR domain, where a number of data points in the set of labeled data points in the SAR domain is significantly fewer than a number of data points in the set of labeled data points in the EO domain.

In another aspect, Sliced-Wasserstein Distance (SWD) is used to determine the measured similarity.

In another aspect, SWD is used to minimize a discrepancy between an EO domain probability distribution and a SAR domain probability distribution in a latent space of a neural auto-encoder in order to supervise training of domain-specific encoders.

In another aspect, the set of labeled data points in the SAR domain and a set of unlabeled data points in the SAR domain are used to align an EO probability distribution and a SAR domain probability distribution.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
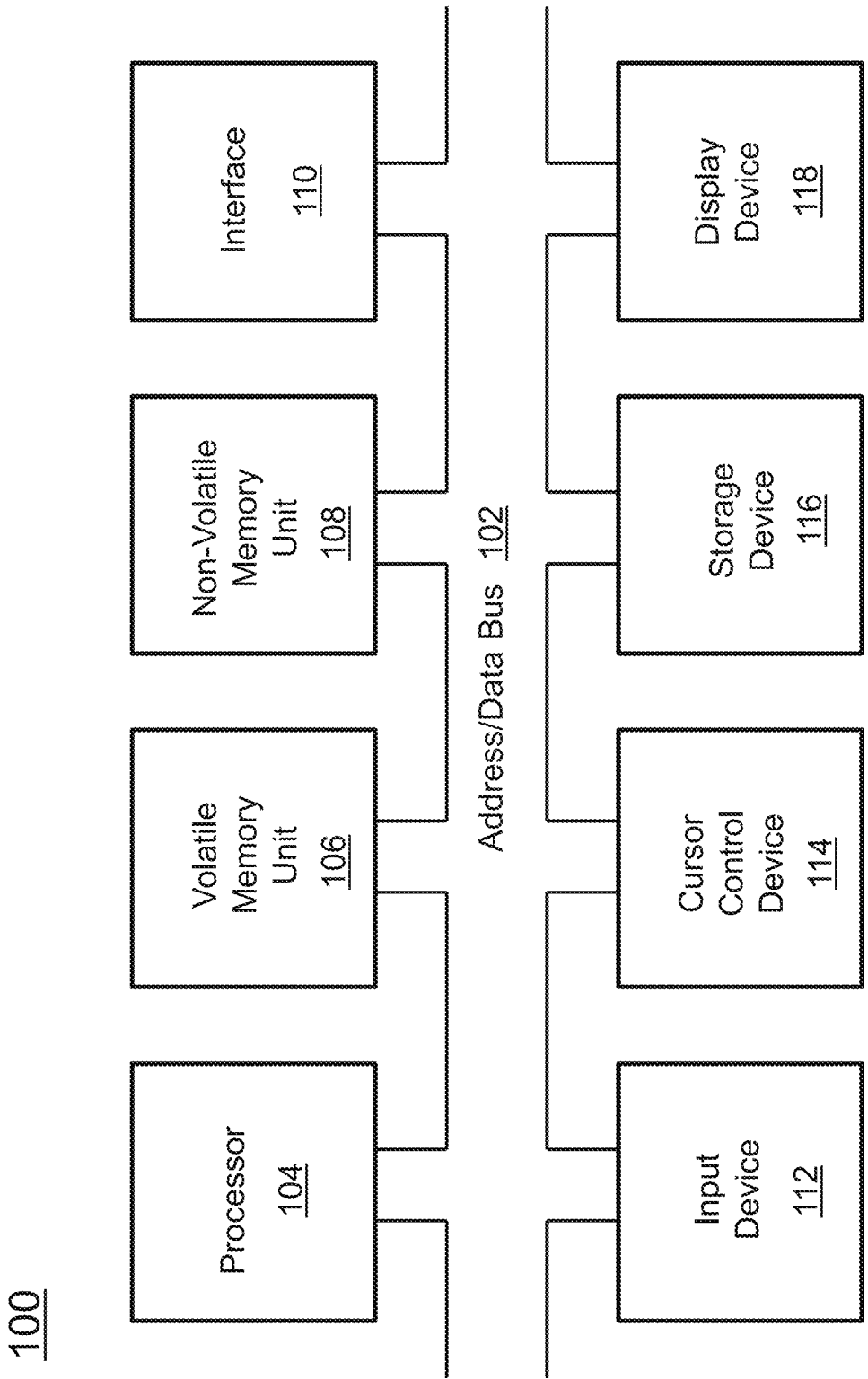
FIG. 1 is a block diagram depicting the components of a system for transferring knowledge from the electro-optical (EO) domain to the synthetic-aperture-radar (SAR) domain according to some embodiments of the present disclosure.

The present invention relates to a system for transferring knowledge from the electro-optical (EO) domain to the synthetic-aperture-radar (SAR) domain, and more particularly, to a system for transferring knowledge from the EO domain to the SAR domain using a semi-supervised domain adaptation framework. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Nicolas Bonneel, Julien Rabin, Gabriel Peyre', and Hanspeter Pfister. Sliced and Radon Wasserstein barycenters of measures. Journal of Mathematical Imaging and Vision, 51(1):22-45, 2015.
2. Mathieu Carriere, Marco Cuturi, and Steve Oudot. Sliced wasserstein kernel for persistence diagrams. arXiv preprint arXiv:1706.03358, 2017.
3. S. Chen, H. Wang, F. Xu, and Y. Jin. Target classification using the deep convolutional networks for SAR images. IEEE Trans. on Geo. and Remote Sens., 54(8):4806-4817, 2016.
4. N. Courty, R. Flamary, D. Tuia, and A. Rakotomamonjy. Optimal transport for domain adaptation. IEEE TPAMI, 39(9):1853-1865, 2017.
5. B. Damodaran, B. Kellenberger, R. Flamary, D. Tuia, and N. Courty. Deepjdot: Deep joint distribution optimal transport for unsupervised domain adaptation. arXiv preprint arXiv:1803.10081, 2018.
6. H. Daume' III. Frustratingly easy domain adaptation. arXiv preprint arXiv:0907.1815, 2009.
7. Hal Daume III and Daniel Marcu. Domain adaptation for statistical classifiers. Journal of artificial Intelligence research, 26:101-126, 2006.
8. I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pages 2672-2680, 2014.
9. Arthur Gretton, Alex Smola, Jiayuan Huang, Marcel Schmittfull, Karsten Borgwardt, and Bernhard Scholkopf. Covariate shift by kernel mean matching. Dataset shift in machine learning, 3(4):5, 2009.
10. R. Hammell. Ships in satellite imagery, 2017. Data retrieved from Kaggle at https://www.kaggle.com/rhammell/ships-in-satellite-imagery.
11. Z. Huang, Z. Pan, and B. Lei. Transfer learning with deep convolutional neural network for sar target classification with limited labeled data. Remote Sensing, 9(9): 907, 2017.
12. Diederik P Kingma and Jimmy Ba. Adam: A method for stochastic optimization. arXiv preprint arXiv:1412.6980, 2014.
13. E. Kodirov, T. Xiang, Z. Fu, and S. Gong. Unsupervised domain adaptation for zero-shot learning. In Proceedings of the IEEE International Conference on Computer Vision, pages 2452-2460, 2015.
14. Soheil Kolouri, Se Rim Park, Matthew Thorpe, Dejan Slepcev, and Gustavo K Rohde. Optimal mass transport: Signal processing and machine-learning applications. IEEE Signal Processing Magazine, 34(4):43-59, 2017.
15. Soheil Kolouri, Philip E Pope, Charles E Martin, and Gustavo K Rohde. Sliced-wasserstein auto-encoders. International Conference on Learning Representation (ICLR), 2019.
16. Soheil Kolouri, Gustavo K Rohde, and Heiko Hoffman. Sliced Wasserstein distance for learning Gaussian mixture models. In IEEE Conference on Computer Vision and Pattern Recognition, pages 3427-3436, 2018.
17. Soheil Kolouri, Yang Zou, and Gustavo K Rohde. Sliced wasserstein kernels for probability distributions. In Proceedings of the IEEE Conference on Computer Vision and Pattern Recognition, pages 5258-5267, 2016.
18. V. Koo, Y. Chan, G. Vetharatnam, M. Y. Chua, C. Lim, C. Lim, C. Thum, T. Lim, Z. bin Ahmad, K. Mahmood, et al. A new unmanned aerial vehicle synthetic aperture radar for environmental monitoring. Progress In Electromagnetics Research, 122:245-268, 2012.
19. Haitao Lang, Siwen Wu, and Yongjie Xu. Ship classification in sar images improved by ais knowledge transfer. IEEE Geoscience and Remote Sensing Letters, 15(3):439-443, 2018.
20. Mingsheng Long, JianminWang, Guiguang Ding, Jiaguang Sun, and Philip S Yu. Transfer joint matching for unsupervised domain adaptation. In Proceedings of the IEEE conference on computer vision and pattern recognition, pages 1410-1417, 2014.
21. D. Malmgren-Hansen, A. Kusk, J. Dall, A. Nielsen, R. Engholm, and H. Skriver. Improving sar automatic target recognition models with transfer learning from simulated data. IEEE Geoscience and Remote Sensing Letters, 14(9):1484-1488, 2017.
22. Leland McInnes, John Healy, and James Melville. Umap: Uniform manifold approximation and projection for dimension reduction. arXiv preprint arXiv: 1802.03426, 2018.
23. J. Rabin, G. Peyr'e, J. Delon, and M. Bernot. Wasserstein barycenter and its application to texture mixing. In International Conference on Scale Space and Variational Methods in Computer Vision, pages 435-446. Springer, 2011.
24. Julien Rabin, Gabriel Peyr'e, Julie Delon, and Marc Bernot. Wasserstein barycenter and its application to texture mixing. In International Conference on Scale Space and Variational Methods in Computer Vision, pages 435-446. Springer, 2011.

25. A. Redko, Land Habrard and M. Sebban. Theoretical analysis of domain adaptation with optimal transport. In Joint European Conference on Machine Learning and Knowledge Discovery in Databases, pages 737-753. Springer, 2017.
26. K. Saenko, B. Kulis, M. Fritz, and T. Darrell. Adapting visual category models to new domains. In European conference on computer vision, pages 213-226. Springer, 2010.
27. C. Schwegmann, W. Kleynhans, B. Salmon, L. Mdakane, and R. Meyer. Very deep learning for ship discrimination in synthetic aperture radar imagery. In IEEE International Geo. and Remote Sensing Symposium, pages 104-107, 2016.
28. Ronghua Shang, Jiaming Wang, Licheng Jiao, Rustam Stolkin, Biao Hou, and Yangyang Li. Sar targets classification based on deep memory convolution neural networks and transfer parameters. IEEE Journal of Selected Topics in Applied Earth Observations and Remote Sensing, 11(8):2834-2846, 2018.
29. Z. Wang, L. Du, J. Mao, B. Liu, and D. Yang. Sar target detection based on ssd with data augmentation and transfer learning. IEEE Geoscience and Remote Sensing Letters, 2018.
30. Jia Zhang, D., W. Heng, K. Ren, and J. Song. Transfer learning with convolutional neural networks for SAR ship recognition. In IOP Conference Series: Materials Science and Engineering, volume 322, page 072001. IOP Publishing, 2018.

(2) Principal Aspects

Various embodiments of the invention include three "principal" aspects. The first is a system for transferring knowledge from the electro-optical (EO) domain to the synthetic-aperture-radar (SAR) domain. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
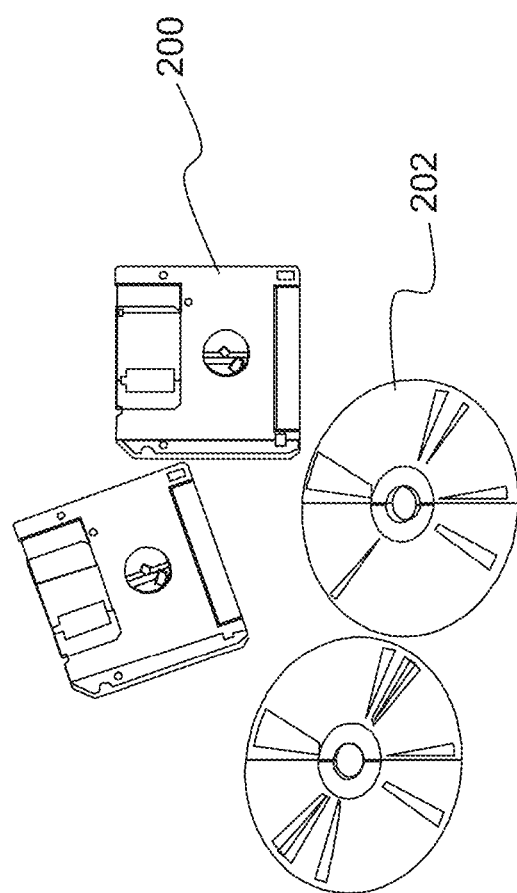
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Figure 3:
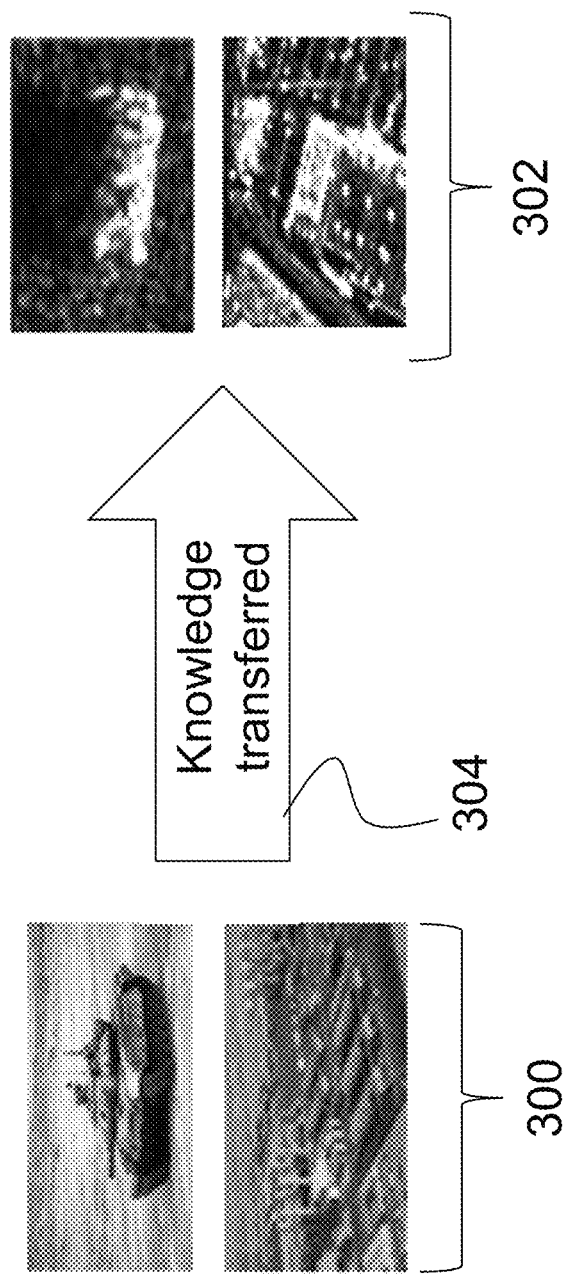
FIG. 3 is an illustration of transfer of learned knowledge in the EO domain to the SAR domain according to some embodiments of the present disclosure.

Described is a machine learning system and method that is capable of transferring its learned knowledge in the Electro-Optical (EO) domain to the Synthetic-Aperture-Radar (SAR) domain, and perform reliable object detection on SAR images with only very few labeled data samples (e.g., O(10)). As shown in FIG. 3, the system enables a machine learning agent to transfer its learned (or trained) information/data (i.e., knowledge) in the EO domain (element 300) to knowledge used in the SAR domain (element 302), such as performing various vision tasks including object detection, object recognition, and prediction. In short, a unique semi-supervised domain adaptation framework is devised to transfer knowledge (element 304) from the EO domain (element 300) to the SAR domain (element 302) using a mathematical procedure, as will be described in detail below. In one embodiment, the Sliced-Wasserstein Distance (SWD) measure (see Literature Reference Nos. 24, 17, and 16) was used to measure and minimize the discrepancy between the source and the target domain distributions in the latent space of a neural auto-encoder in order to supervise training of domain-specific encoders.

The few accessible labeled data points (i.e., images) as well as unlabeled data points in the SAR domain are used to align both distributions class-conditionally to tackle the class matching challenge (see Literature Reference No. 13). Experimental results validate the approach described herein in the area of maritime domain awareness, where the goal is to detect ships from SAR images. The results demonstrate the learning system according to embodiments of the present disclosure is effective and leads to state-of-the-art performance in object detection from SAR images.

Let $X \subset \mathbb{R}^d$ denote the domain space of SAR data. Consider a multiclass SAR classification problem with k classes in this domain, where independent and identically distributed (i.i.d.) data pairs are drawn from a joint probability distribution (i.e., $(x_i^t, y_i^t) \sim q_T(x, y)$), which has a marginal distribution $p_T(x)$ over X, where $T$ denotes target, i denotes the index for the data point, and t denotes target domain so that $x_i^t$ is the $i^{th}$ data point in the target domain. Here, a label $y_i^t$ identifies the class membership of the vectorized SAR image $x_i^t$ to one of the k classes. There is access to M>>1 unlabeled images $\mathcal{D}_T = (X_T = [x_1^t, \ldots, x_M^t]) \in \mathbb{R}^{d \times M}$ in this target domain. Additionally, there is access to O labeled images $\mathcal{D}'_T = X'_T, Y'_T$, where $X'_S = [x'_1^t, \ldots, x'_O^t] \in \mathbb{R}^{d \times O}$ and $Y'_S = [y'_1^t, \ldots, y'_O^t] \subset \mathbb{R}^{k \times O}$ contains the corresponding one-hot labels, where S denotes source. The goal is to train a parameterized classifier $f_\theta$: $\mathbb{R}^d \to \gamma \subset \mathcal{R}^k$ (i.e., a deep neural network with weight parameters $\theta$) on this domain. Given that there is access to only few labeled data points and considering model complexity of deep neural networks, training the deep network such that it generalizes well using solely the SAR labeled data is not feasible—training would lead to overfitting on the few labeled data points such that the trained network would generalize poorly on test data points.

To tackle the problem of label scarcity, a domain adaptation scenario is considered, where there is access to sufficient labeled data points in a related source EO domain problem. Let $\mathcal{D}_S = (X_S, Y_S)$ denote the labeled dataset in the EO domain, with $X_S \in X \subset \mathbb{R}^{d' \times N}$ and $Y_S \in \gamma \subset \mathbb{R}^{k \times N}$ (N>>1), where d' denotes the size of data dimension in the source domain, and N denotes the number of labeled images in the EO domain. Note that the same classification problem is being considered in two domains (i.e., the same classes similar to the target domain exist in the source domain). In the embodiments discussed in the present disclosure, the target domain is the SAR domain, and the source domain is the EO domain; however, other such target-source pairs of domains exist, and the present disclosure can also be applied to those pairs.

It is assumed that the source samples are drawn i.i.d. from the source joint probability distribution $q_S(x, y)$, which has the marginal distribution $p_S$. Given that extensive research and investigation has been done in EO domains, it was hypothesized that finding such a labeled dataset is likely feasible and is easier than labeling more SAR data points. The goal is to use the similarity between the EO and the SAR domains to train a model for classifying SAR images using the knowledge that can be learned from the EO domain. Since there is access to sufficient labeled data points in the EO domain, training a deep network in this domain is straightforward. Following the standard supervised learning setting, empirical risk minimization (ERM) is used to learn the network optimal weight parameters according to the following:

$$\hat{\theta} = \operatorname*{argmin}_{\theta} \hat{e}_\theta = \operatorname*{argmin}_{\theta} \frac{1}{N} \sum_{i=1}^{N} \mathcal{L}(f_\theta(x_i^S), y_i^S). \quad (1)$$

where $\mathcal{L}$ is a proper loss function (e.g., cross entropy loss), $f_\theta$ is a deep network, and $\theta$ is a vector that contains all the learnable weights of the deep network. Given enough training data points, the empirical risk is a suitable surrogate for the real risk function:

$$e = \mathbb{E}_{(x,y) \sim p_S(x,y)}(\mathcal{L}(f_\theta(x), y)), \quad (2)$$

which is the objective function for Bayes optimal inference. This means that the learned classifier would generalize well on data points if they are drawn from $p_S$. A naive approach to transfer knowledge from the EO domain to the SAR domain is to use the classifier that is trained on the EO domain directly in the target domain. However, since distribution discrepancy exists between the two domains (i.e., $p_S \neq p_T$), the trained classifier on the source domain $f_{\hat{\theta}}$ might not generalize well on the target domain. Therefore, there is a need for adapting the training procedure for $f_{\hat{\theta}}$. The simplest approach, which has been used in most prior works, is to fine-tune the EO classifier using the few labeled target data points to employ the model in the target domain. However, the approach described herein takes advantage of the unlabeled SAR data points, which are accessible and provide additional information about the SAR domain marginal distribution. Additionally, fine tuning requires d=d', which might not always be the case. $\hat{\theta}$ denotes the estimate of $\theta$ that results from training. $\theta$ denotes the real value, which can be slightly different from the estimate.

In the approach according to embodiments of the present disclosure, the EO deep network $f_\theta(\cdot)$ is considered to be formed by a feature extractor $\phi_v(\cdot)$, (i.e., convolutional layers of the network), which is followed by a classifier sub-network $h_w(\cdot)$ (i.e., fully connected layers of the network) that inputs the extracted feature and maps them to the label space. Here, w and v denote the corresponding learnable parameters for these sub-networks (i.e., $\theta = (w, v)$). In other words, the feature extractor sub-network $\phi_v$: $\mathcal{X} \rightarrow \mathcal{Z}$ maps the data points into a discriminative embedding space $z \subset \mathbb{R}^f$, where classification can be done easily by the classifier sub-network $h_w$: $z \rightarrow y$. f denotes the dimension of the embedding space. The success of deep learning stems from optimal feature extraction which converts the data distribution into a multimodal distribution which allows for class separation. Following the above, one can consider an encoder network $\psi_u(\cdot)$: $\mathbb{R}^d \rightarrow \mathbb{R}^f$, which maps the SAR data points to the same target embedding space at its output. The idea is based on training $\phi_v$ and $\phi_u$ such that the discrepancy between the source distribution $p_S(\phi(x))$ and target distribution $p_T(\phi(x))$ is minimized in the shared embedding space. As a result of matching the two distributions, the embedding space becomes invariant with respect to the domain. Consequently, even if the classifier sub-network is trained using solely the source labeled data points, it will still generalize well when target data points are used for testing. The key is how to train the encoder sub-networks such that the embedding space becomes invariant.

Figure 4:
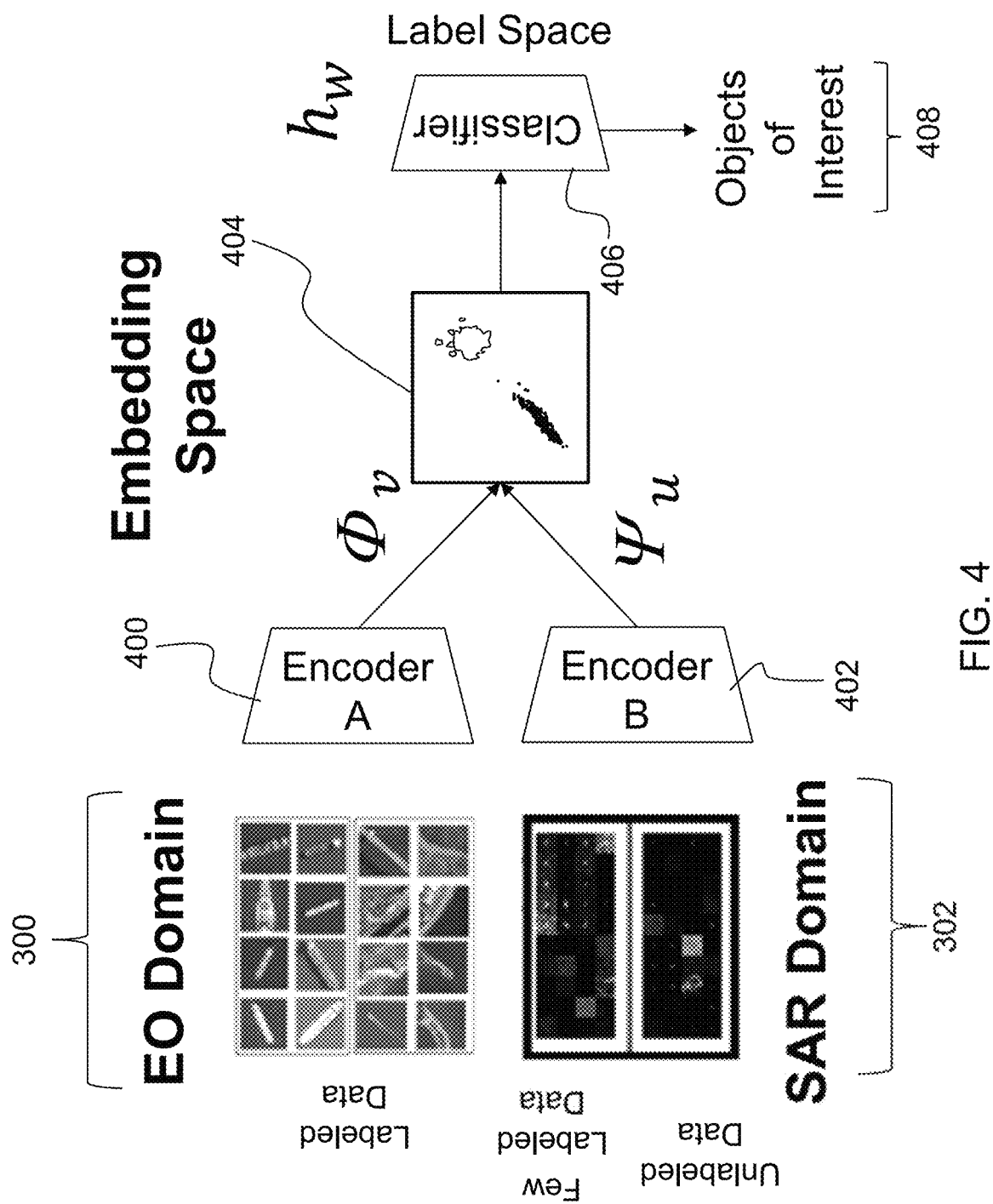
FIG. 4 is a block diagram illustrating a framework for transferring knowledge from the EO domain to the SAR domain according to some embodiments of the present disclosure.

FIG. 4 depicts a block diagram visualization of the framework for transferring knowledge from the EO to the SAR domain according to embodiments of the present disclosure. Two deep convolutional neural networks with a shared output space (i.e., deep encoders: encoder A (element 400) and encoder B (element 402)) preprocess data to enforce both EO domain (element 300) data and SAR domain (element 302) data to have similar probability distributions in their shared output. This space can be considered as an intermediate embedding space (element 404) between the input space from each domain and label space of a shared classifier sub-network (element 406) between the two domains. The shared classifier sub-network (element 406) classifies regions of interest in a SAR image to determine whether the region of interest corresponds to an object of interest, and regions of interest that contain an object of interest are output (element 408). The deep encoders (elements 400 and 402) are trained such that the discrepancy between the source and the target domain distributions is minimized in the shared embedding space (element 404), while overall classification is supervised via the EO domain (element 300) labeled data. This procedure has been done via both adversarial learning (see Literature Reference No. 8) and as an optimization problem with probability matching objective (see Literature Reference No. 4).

In order to minimize the distance between two probability distributions, minimization with respect to a measure of distance between two empirical distributions is performed. Early works in domain adaptation used the Maximum Mean Discrepancy (MMD) metric for this purpose (see Literature Reference No. 9). MMD measures the distance between two distributions as the Euclidean distance between their means. However, MMD might not be an accurate measure when the distributions are multi-modal. Other common discrepancy measures, such as KL divergence and Jensen-Shannon divergence, can be used for a broader range of domain adaptation problems, as described in Literature Reference No. 7. However, these measures have vanishing gradients when the distributions are too distant, which makes them inappropriate for deep learning, as deep networks are trained using gradient-based first-order optimization (see Literature Reference No. 15). For this reason, recent works in deep learning use the Wasserstein Distance (WD) metric as an objective function to match distributions. WD has a non-vanishing gradient, but it does not have a closed-form definition and is defined as a linear programming (LP) problem. Solving the LP problem can be computationally expensive for high-dimensional distributions. To circumvent this challenge, the Sliced Wasserstein Distance (SWD) was used. SWD approximates the WD as a sum of multiple Wasserstein distances of one-dimensional distributions, which possess a closed-form solution (see Literature Reference Nos. 1, 2, 15, and 24).

(3.1) A Devised Optimization Solution

In the solution described herein, the encoder sub-networks (encoder A (element 400) and encoder B (element 402)) need to be learned such that the extracted features in the encoder output are discriminative. Only then can the classes become separable for the classifier sub-network (element 406). This is a direct result of supervised learning for the EO encoder (encoder A (element 400)). Additionally, the encoders (elements 400 and 402) should mix the SAR and the EO domains (elements 302 and 300) such that the embedding becomes domain-invariant. Hence, the SAR encoder (encoder B (element 402)) indirectly is enforced to be discriminative for the SAR domain (element 302).

Domain invariance can be enforced by minimizing the discrepancy between the distributions of both domains in the embedding space (element 404). Following the above, one can formulate the following optimization problem for computing optimal values for v, u, and w according to the following:

$$\min_{v,u,w} \frac{1}{N} \sum_{i=1}^{N} \mathcal{L}(h_w(\phi_v(x_i^s)), y_i^s) + \qquad (3)$$

$$\frac{1}{O} \sum_{i=1}^{O} \mathcal{L}(h_w(\psi_u(x_i^{t'})), y_i^{t'}) + \lambda D(\phi_v(p_S(X_S)), \psi_u(p_T(X_T))) +$$

$$\eta \sum_{j=1}^{k} D(\phi_v(p_S(X_S) \mid C_j), \psi_u(p_T(X_T') \mid C_j)),$$

where $D(\cdot,\cdot)$ is a discrepancy measure between the probabilities and $\lambda$ and $\eta$ are trade-off parameters. The index in the sum changes over all classes. For each class, C is fixed and then the distance is computed. The first two terms in Equation (3) are empirical risks for classifying the EO and SAR labeled data points, respectively. The third term is the cross-domain unconditional probability matching loss. The matching loss is computed using all available data points from both domains to learn the learnable parameters of encoder sub-networks (elements 400 and 402) and the classifier sub-network (element 406) is simultaneously learned using the labeled data from both domains. Finally, the last term in Equation (3) is added to enforce semantic consistency between the two domains. This term is important for knowledge transfer. To clarify this point, note that the domains might be aligned such that their marginal distributions $\phi(p_S(X_S))$ and $\psi(p_T(X_T))$ (i.e., not conditioned on any of the classes) have minimal discrepancy, while the distance between $\phi(p_S(\cdot,\cdot))$ and $\psi(p_T(\cdot,\cdot))$ is not minimized. This means that the classes may not have been aligned correctly. For example, images belonging to a class in the target domain may be matched to a wrong class in the source domain or, even worse, images from multiple classes in the target domain may be matched to a cluster of another class of the source domain. In such cases, the classifier will not generalize well on the target domain as it has been trained to be consistent with spatial arrangement of the source domain in the embedding space. This means that if the distance between $\phi(p_S(X_S))$ and $\psi(p_T(X_T))$ is merely minimized, the shared embedding space might not be a consistently discriminative space for both domains in terms of classes. The challenge of class-matching is a known problem in domain adaptation and several approaches have been developed to address this challenge (see Literature Reference No. 20). In the framework described herein, the few labeled data points in the target SAR domain can be used to match the classes consistently across both domains. These data points are used to compute the fourth term in Equation (3). This term is added to match class-conditional probabilities of both domains in the embedding space (i.e., $\phi(p_S(x_S) \mid C_j \approx \psi(p_T(x \mid C_j)$, where $C_j$ denotes a particular class.

The final key question is to select a proper metric to compute $D(\cdot,\cdot)$ in the last two terms of Equation (2). KL divergence and Jensen-Shannon divergence have been used extensively to measure closeness of probability distributions as maximizing the log-likelihood is equivalent to minimizing the KL-divergence between two distributions but note that since SGD will be used to solve the optimization problem in Equation (2), they are not suitable. This is a major reason for success of adversarial learning, as described in Literature Reference No. 8.

Additionally, the distributions $\phi(p_S(x))$ and $\psi(p_T(x))$ are unknown and only observed samples can be relied on from these distributions. Therefore, the discrepancy measure, $D(\cdot,\cdot)$ should be able to be computed using only the drawn samples. Optimal transport is a suitable metric to deal with the above issues and due to it being an effective metric, it has been used extensively in deep learning literature recently (see Literature Reference Nos. 4, 5, 14, and 25). In this disclosure, the Sliced Wasserstein Distance (SWD) (described in Literature Reference No. 23) is used, which is a good approximate of optimal transport (see Literature Reference No. 16) and can be computed more efficiently.

The Wasserstein distance is defined as the solution to a linear programming problem. However, for the case of one-dimensional probability distributions, this problem has a closed form solution which can be computed efficiently. The solution is equal to the $\ell_p$-distance, between the inverse of the cumulative distribution functions of the two distributions. SWD has been proposed to benefit from this property. The idea is to decompose d-dimensional distributions into one-dimension marginal distributions by projecting the distribution along all possible hyperplanes that cover the space. This process is called slicing the high-dimensional distributions. For a distribution $p_S$, a one-dimensional slice of the distribution along the projection direction $\gamma$ is defined as:

$$\mathcal{R}_{p_S}(t;\gamma) = \int_S p_s(x)\delta(t - \langle \gamma, x \rangle) dx, \qquad (4)$$

where $\delta(\cdot)$ denotes the Kronecker delta function, $\langle \cdot,\cdot \rangle$ denotes the vector dot product, and $\mathbb{S}^{d-1}$ is the d-dimensional unit sphere. $\mathcal{R}_{p_S}(\cdot;\gamma)$ is computed via integrating $p_S$ over the hyperplanes which are orthogonal to the projection directions $\gamma$ that cover the space.

The SWD is computed by integrating the Wasserstein distance between sliced distributions over all $\gamma$:

$$SW(p_S, p_T) = \int_{\mathbb{S}^{d-1}} W(\mathcal{R}_{p_S}(\cdot;\gamma), \mathcal{R}_{p_T}(\cdot;\gamma)) d\gamma, \qquad (5)$$

where $W(\cdot,\cdot)$ denotes the Wasserstein distance. Computing the above integral directly, is computationally expensive. However, the integral in Equation (5) can be approximated using a Monte Carlo style integration by choosing L number of random projection directions $\gamma$ and after computing the Wasserstein distance, averaging along the random directions.

In the problem described herein, there is access only to samples from the two source and target distributions, so the one-dimensional Wasserstein distance is approximated as the $\ell_p$-distance between the sorted samples, as the empirical commutative probability distributions. Following the above procedure, the SWD between f-dimensional samples $\{\phi(x_i^S) \in \mathbb{R}^f \sim p_S\}_{i=1}^M$ and $\{\phi(x_i^T) \in \mathbb{R}^f \sim p_T\}_{j=1}^M$ can be approximated as the following sum:

$$SW^2(p_S, p_T) \approx \frac{1}{L} \sum_{l=1}^{L} \sum_{i=1}^{M} |\langle \gamma_l, \phi(x_{s_l[i]}^S) \rangle - \langle \gamma_l, \phi(x_{t_l[i]}^T) \rangle|^2, \qquad (6)$$

where $\gamma_l \in \mathbb{S}^{f-1}$ is a uniformly drawn random sample from the unit f-dimensional ball $\mathbb{S}^{f-1}$ and $s_l[i]$ and $t_l[i]$ are the sorted indices of $\{\gamma_l \cdot \phi(x_i)\}_{i=1}^M$ for source and target domains, respectively. The SWD was utilized as the discrepancy measure between the probability distributions to match them in the embedding space. The algorithm for few-shot SAR image classification (FSC) using cross-domain knowledge transfer is summarized in Algorithm 1 below. Note that a pretraining step was added which trains the EO encoder and the shared classifier sub-network solely on the EO domain for better initialization.

---
Algorithm 1 FCS (L, η, λ)
---

1. Input: data
2. $\mathcal{D}_S = (X_S, Y_S); \mathcal{D}_T = (X_T, , Y_T), \mathcal{D}'_T = (X'_T)$.
3. Pre-training: initialization
4. $\hat{\theta}_O = (w_O, v_O) = \operatorname{argmin}_\theta 1/N \Sigma_{i\,=\,1}{}^N \mathcal{L}(f_\theta\,(x^s_i),\,y^s_i)$
5. for itr =1, ..., ITR do
6. Update encoder parameters using:
7. $\hat{v}, \hat{u} = \lambda D\,(\phi_v,\,p_S\,(X_S)),\,\psi_u\,\,p_T\,(X_T)))$
8. $+\eta\Sigma_j D\,(\phi_v,\,p_S\,(X_S)\,|\,C_j),\,\psi_v\,\,(p_{SL}\,(X'_T)\,|\,C_j))$
9. Update entire parameters:
10. $\hat{v}, \hat{u}, \hat{w} = \operatorname{argmin}_{w,\,v,\,u} 1/N \Sigma_{i\,=\,1}{}^N \mathcal{L}\,(h_w\,(\phi_v\,(x^s_i)),\,y^s_i)$
11. $+1/O \Sigma_{i\,=\,1}{}^O \mathcal{L}\,(h_w\,(\psi_u\,(x'^t_i))\,,\,y'^t_i)$ (3.2) Experimental Studies The effectiveness of the method describe herein was demonstrated in the area of maritime domain awareness on SAR ship detection.

(3.2.1) Ship Detection Dataset

The approach according to embodiments of the present disclosure was tested in the binary problem of ship detection using SAR images (see Literature Reference No. 27). This problem arises within maritime domain awareness (MDA), where the goal is monitoring large areas of ocean to decipher maritime activities that could impact the safety and the environment. Ships are an important objective in this application as the majority of important activities is related to ships. To reach this end, SAR imaging is highly effective because monitoring is done continually over extended time intervals.

In order to automate the monitoring process, classic image processing techniques are used to determine regions of interest in aerial SAR images. First, land areas are removed and then ships, ship-like, and ocean regions are identified and then extracted as square image patches. These image patches are then fed into a classification algorithm to determine whether the region corresponds to a ship (i.e., an object of interest) or not. Regions containing objects of interest are output to a user, or used for further processing, such as object tracking or causing motion of another item based on the region (e.g., causing a vehicle to perform a maneuver to avoid a collision, etc.)

The dataset used is obtained from aerial SAR images of the South African Exclusive Economic Zone. The dataset is pre-processed into 51×51 pixels sub-images (see Literature Reference No. 27). Each instance either contains ships (positive data points), or no-ship (negative data points). The dataset contains 1436 positive examples and 1436 negative sub-images. The labels are provided by experts. The problem is recast as a few-shot learning problem. To solve this problem using knowledge transfer, the "EO Ships in Satellite Imagery" dataset (see Literature Reference No. 10) is used. The EO and SAR datasets used by the present disclosure need not be for the same time and location. The dataset is prepared to automate monitoring port activity levels and supply chain analysis, and contains images extracted from Planet satellite imagery over the San Francisco Bay area with 4000 RGB 80×80 images. Again, each instance is either a ship image (a positive data point), or no-ship (a negative data point). The dataset is split evenly into positive and negative samples. Instances from both datasets are visualized in FIG. 4. Notice that SAR images are confusing for the untrained human eye, compared to EO ship/no-ship images, which suggests SAR labeling is more challenging and requires expertise.

(3.2.2) Methodology

A deep CNN with 2 layers of convolutional filters is considered for the SAR domain, with 16, and 32 filters in these layers, respectively. Both maxpool and batch normalization layers were used in these convolutional layers. These layers are used as the SAR encoder sub-network in the framework, φ. These layers are followed by a flattening layer and a subsequent dense layer as the embedding space with dimension f, which potentially can be tuned as a parameter. After the embedding space layer, a shallow two-layer classifier based on Equation (3) was used. The EO encoder has similar structure with the exception of using three convolutional layers. Three layers have been used, as the EO dataset seems to have more details, and a more complex model can be helpful. In one embodiment, TensorFlow was used for implementation and the Adam optimizer (see Literature Reference No. 12).

For comparison purposes, the experimental results were compared against the following learning settings: 1) supervised training on the SAR domain (ST): a network was trained directly in the SAR domain using the few labeled SAR data points to generate a lower-bound for approach to demonstrate that knowledge transfer is effective; (2) direct transfer (DT): we just directly used the network that is trained on EO data directly in the SAR domain. In order to do this, the EO domain was resized to 51×51 pixels so the same shared encoder networks can be used for both domains. As a result, potentially helpful details may be lost. This can be served as a second lower-bound to demonstrate that there is a benefit from unlabeled data; 3) fine tuning (FT): the no transfer network from previous method was used, and the network was fine-tuned using the few available SAR data points. As described above, this is the main strategy that prior works have used in the literature to transfer knowledge from the EO to the SAR domain and is served to compare against previous methods.

In experimental studies, a 90/10% random split for the whole EO/SAR data was used for training the model and testing performance. In experiments, the performance on the SAR testing split is reported to compare the methods. The classification accuracy rate was used to measure performance and, whenever necessary, cross validation was utilized to tune the hyper parameters. Each experiment was repeated twenty times and the average and the standard error bound were reported to demonstrate statistical significance in the experiments.

(3.2.3) Results

Figure 5:
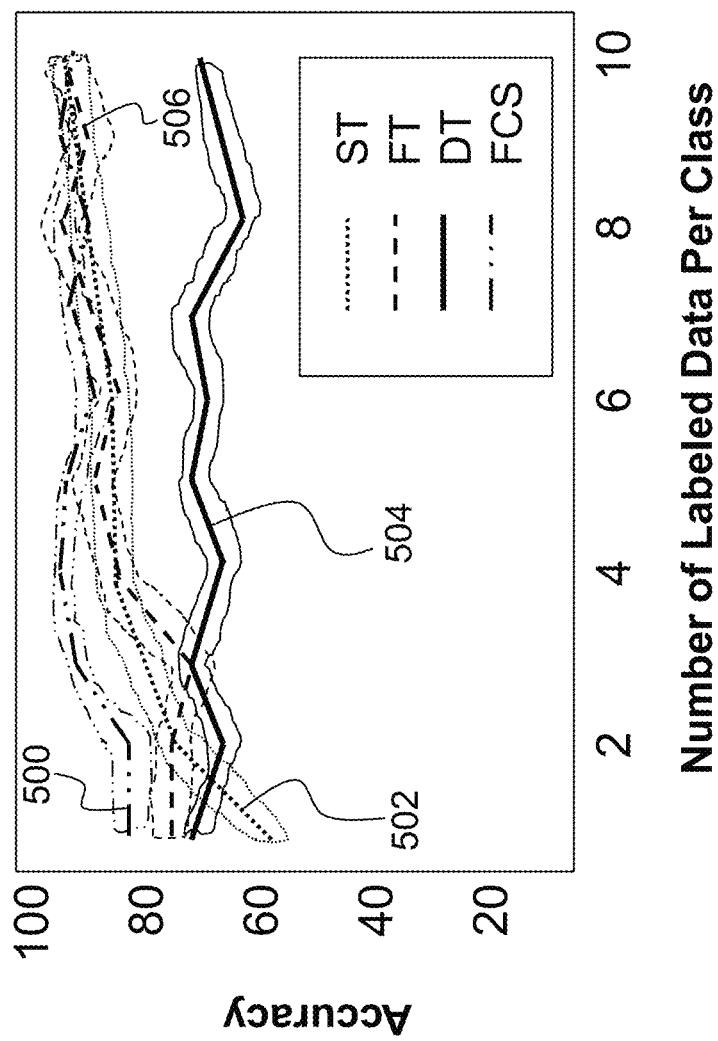
FIG. 5 is an illustration of the SAR test performance versus the number of labeled data per class according to some embodiments of the present disclosure.

FIG. 5 depicts the SAR test performance versus the number of labeled data points per class that has been used for the SAR domain, where the y-axis denotes the classification accuracy and the x-axis denotes the number of labeled data per class for the SAR domain that are used to execute the algorithm. The performance results show results for the method described herein (FCS (few-show SAR image classification); curve 500) and three existing methods, including supervised training on the SAR domain (ST; curve 502), direct transfer (DT; curve 504), and fine tuning (FT; curve 506). For each curve, the line denotes the average performance over all trials and the region surrounding the line denotes the standard error deviation. Results accord with intuition. Supervised training (curve 502) on the SAR domain is not effective in few shot region (i.e., its performance is close to chance). The direct transfer (curve 504)

method boosts the performance in few-shot regime considerably (about 20%). However, after two to three labeled samples per class, supervised training (curve 502) overtakes direct transfer (curve 504) as task data is used, as expected. Fine tuning (curve 506) can improve the direct transfer performance, but only few-shot regime, and beyond few-shot learning regime, the performance is similar to supervised training (curve 502).

Figure 6:
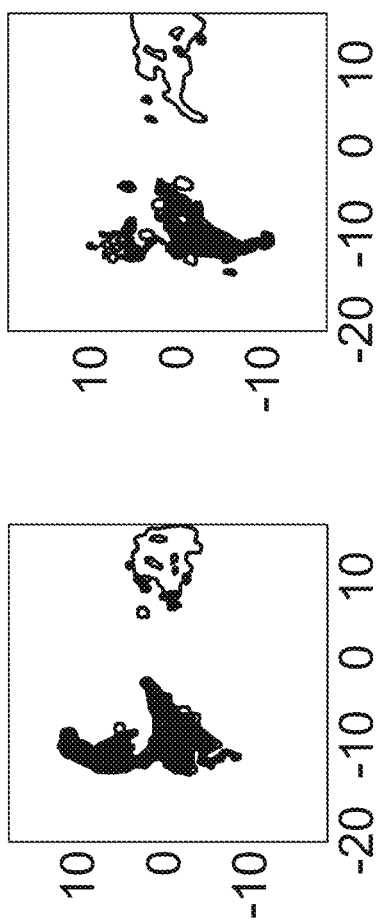
FIG. 6A is an illustration of a Umap visualization of the EO domain with real labels according to some embodiments of the present disclosure.
FIG. 6B is an illustration of a Umap visualization of the SAR domain with real labels according to some embodiments of the present disclosure.
FIG. 6C is an illustration of a Umap visualization of the EO domain with predicted labels according to some embodiments of the present disclosure.
FIG. 6D is an illustration of a Umap visualization of the SAR domain with labeled and unlabeled data according to some embodiments of the present disclosure.
Figure 6:
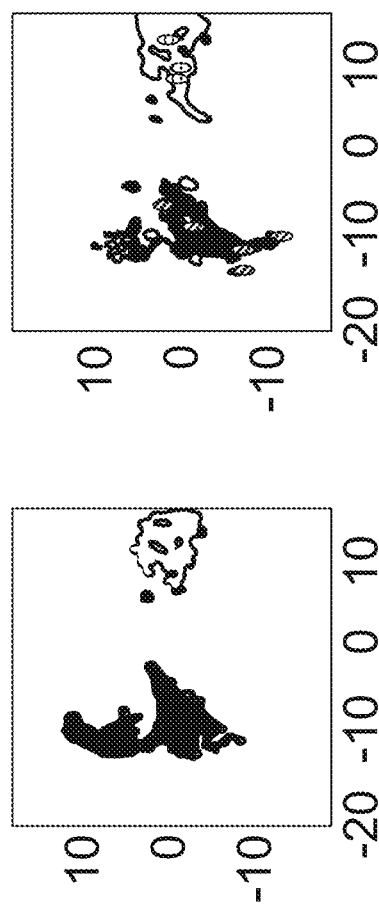

The method according to embodiments of the present disclosure (curve 500) outperforms all existing methods due to the benefit from SAR unlabeled data points. As shown in FIG. 5, the approach described herein is effective and leads to a 30% boost from almost no-learning baseline (i.e., 50% performance, in few-shot learning regime). For having better intuition, FIGS. 6A-6D depict the Umap (see Literature Reference No. 22) embedding of the EO and SAR data points in the learned embedding as the output of the feature extractor encoders when five labeled data points per class were used in the SAR domain. In FIGS. 6A-6D, filled and unfilled regions each correspond to one of the classes. In FIGS. 6A and 6B, real labels were used for visualization, and in FIGS. 6C and 6D, the predicted labels by the method described herein were used for visualization. In FIG. 6D the striped regions represent the SAR labeled data points that had been used in training. By comparing the plots, it is obvious that the embedding is discriminative for both domains. Additionally, it is obvious that the domain distributions are matched in the embedding class conditionally, suggesting the framework formulated in Equation (3) is effective. This result suggests that learning an invariant embedding space can serve as a helpful strategy for transferring knowledge.

Figure 7:
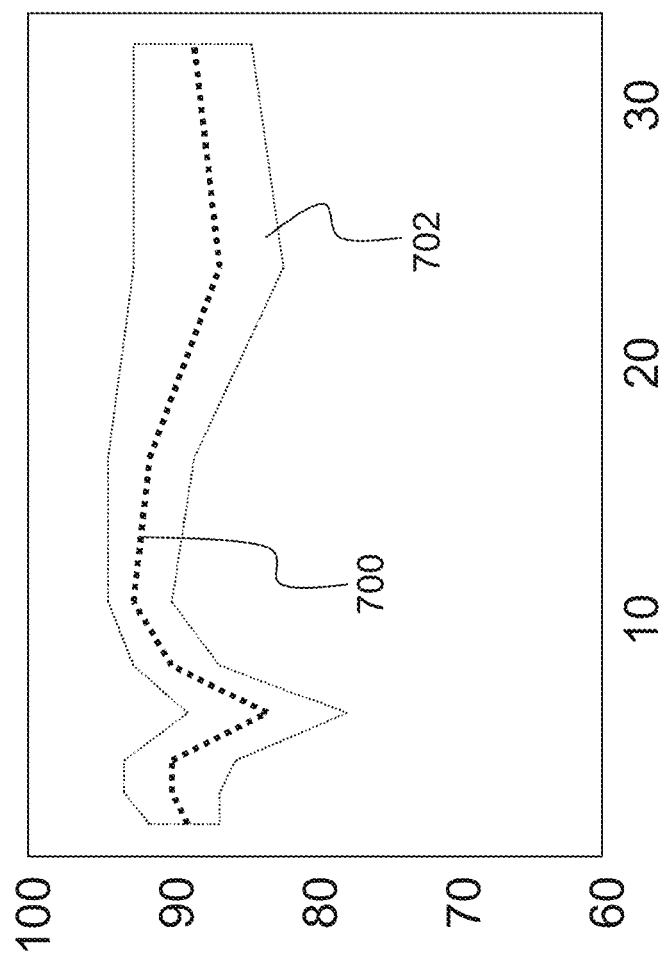
FIG. 7 is an illustration of the test performance versus the dimension of the embedding space according to some embodiments of the present disclosure.
Figure 8B:
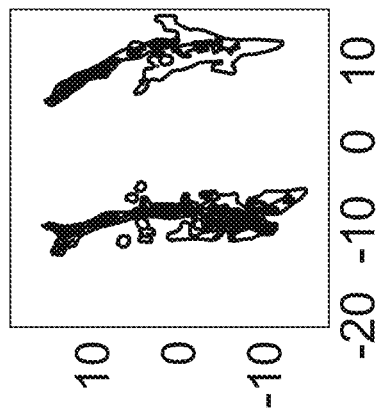
FIG. 8B is an illustration of a Umap visualization of the SAR domain with real labels for the ablation study according to some embodiments of the present disclosure.
Figure 8D:
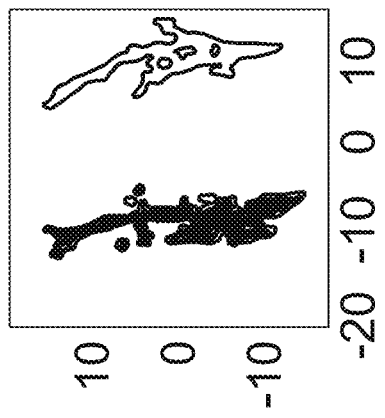
FIG. 8D is an illustration of a Umap visualization of the SAR domain with predicted labels for an ablation study according to some embodiments of the present disclosure.
Figure 8A:
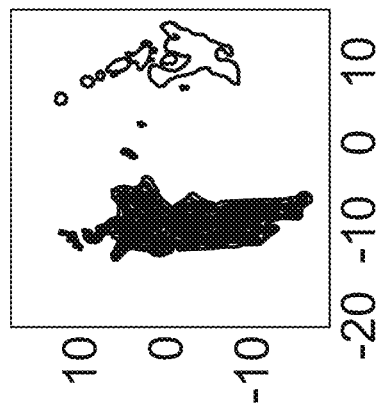
FIG. 8A is an illustration of a Umap visualization of the EO domain with real labels for an ablation study according to some embodiments of the present disclosure.
Figure 8C:
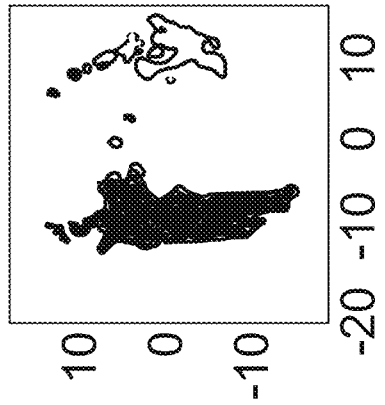
FIG. 8C is an illustration of a Umap visualization of the EO domain with predicted labels for an ablation study according to some embodiments of the present disclosure.

A set of experiments to empirically study the effect of dimension of the embedding space on performance of the algorithm described herein was also performed. FIG. 7 depicts performance on SAR testing set versus dimension of the embedding space when 10 SAR labeled data per class is used for training. The dashed line (element 700) denotes the average performance over ten trials, and the region (element 702) surrounding the line denotes the standard error deviation. It was observed that the performance is quite stable when the embedding space dimension changes. This result suggests that if the learned embedding space is discriminative for the source domain, then the method can successfully match the target domain distribution to the source distribution in the embedding. It was concluded that for computational efficiency, it is better to select the embedding dimension to be as small as possible. For this reason, the dimension of the embedding was set to be eight for the other experiments in this disclosure, as it was concluded from FIG. 7 that increasing the dimension beyond eight is not helpful.

Finally, an experiment to serve as an ablation study for the framework was performed. The experiments described above demonstrated that the first three terms in Equation (3) are all important for successful knowledge transfer. The fourth term is important for class-conditional alignment. Equation (3) was solved without considering the fourth term to study its effect. The Umap visualization of the datasets in the embedding space is shown in FIGS. 8A-8D. It was observed that, as expected, the embedding is discriminative for EO dataset and predicted labels are close to the real data labels as the classes are separable. However, despite following a similar marginal distribution in the embedding space, the formed SAR clusters are not class-specific. Since in each cluster there are data points from both classes, classification rate is poor. This result demonstrates that all the terms in Equation (3) are important for the success of the algorithm described herein.

In summary, the system according to embodiments of the present disclosure recasts the problem of labeled data scarcity in the SAR domain as a domain adaptation (DA) problem, where the goal is to adapt a model trained on the source domain to generalize well in the target domain. The system described herein transfers knowledge from an EO imaging domain in order to train a deep network for the SAR domain. The idea is to train a deep network on a related EO problem with abundant labeled data and adapt the model using only a few labeled SAR data points such that the distributions of both domains become similar within a mid-layer of the network as an embedding space.

The system according to embodiments of the present disclosure has applications in SAR-based data analytics and machine learning. For instance, large datasets of aerial EO images can be leveraged to train a machine learning system, which can leverage its learned knowledge in the EO domain and perform object detection on SAR images. The machine learning system can also leverage its learned knowledge in the EO domain to perform prediction, classification, and data completion on SAR images. The system described herein can be used in numerous intelligence, surveillance, and reconnaissance applications. SAR is capable of high-resolution remote sensing, independent of flight altitude, and independent of weather. Additionally, SAR has day and night imaging capability as illumination is provided by the SAR. Applications of SAR include topography, oceanography, glaciology, geology (for example, terrain discrimination and subsurface imaging), and forestry, including forest height, biomass, deforestation. In addition, SAR is useful in environment monitoring such as oil spills, flooding, urban growth, global change and military surveillance.

Figure 9:
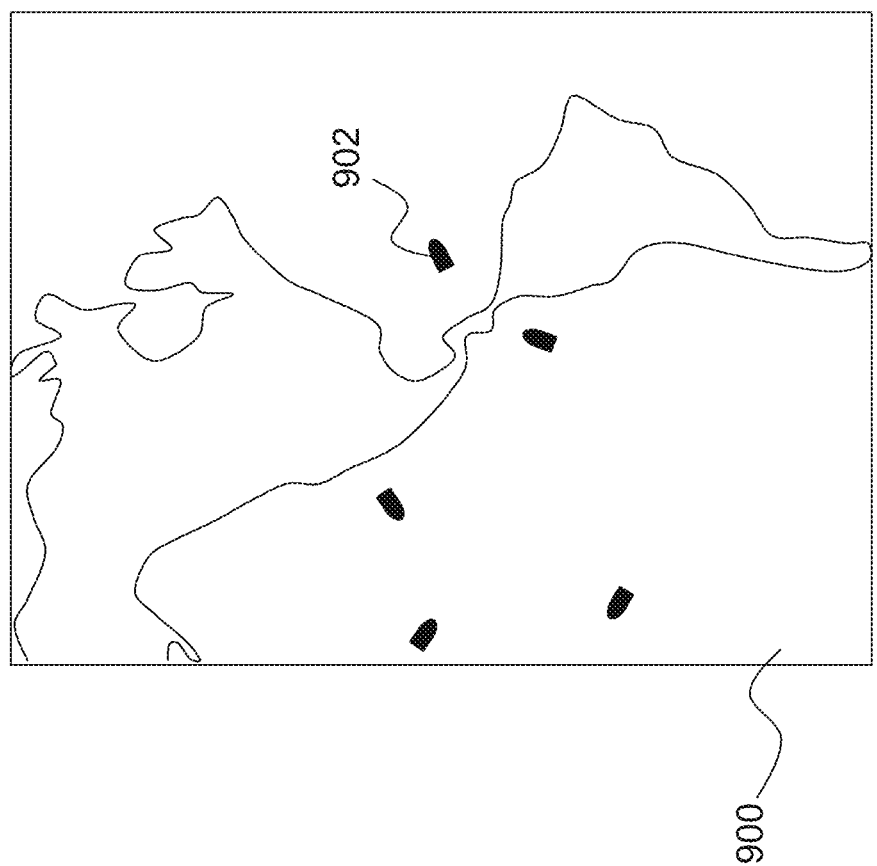
FIG. 9 is an illustration of a visualization map for ship monitoring and tracking according to some embodiments of the present disclosure.

Furthermore, the system described herein can be useful in monitoring and tracking movement of ships at sea. As described above, monitoring and deciphering maritime activities, including ship movements, can impact ocean and ship safety. Moreover, monitoring port activity levels and supply chain analysis can be automated. By identifying objects as ships and non-ships from aerial SAR images using the system according to embodiments of the present disclosure, the ships can be displayed on a visualization map, tracked on the visualization map, and the visualization map can be automatically updated to reflect changes in the position of the ship. FIG. 9 depicts an example visualization map (element 900) for monitoring and tracking of an object classified as a ship (e.g., element 902).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for transferring learned knowledge from an electro-optical (EO) domain to a synthetic-aperture-radar (SAR) domain, the system comprising:
one or more processors and a non-transitory computer-readable medium having executable instructions encoded thereon such that when executed, the one or more processors perform an operation of:
using a measured similarity between the EO domain and the SAR domain, training a model for classifying SAR images using knowledge previously learned from the electro-optical (EO) domain,
wherein Sliced-Wasserstein Distance (SWD) is used to determine the measured similarity,
wherein SWD is used to minimize a discrepancy between an EO domain probability distribution and a SAR domain probability distribution in a latent space of a neural auto-encoder in order to supervise training of domain-specific encoders;
using the trained model, processing a SAR image to determine regions of interest in the SAR image;
classifying a region of interest to determine whether the region of interest corresponds to an object of interest;
outputting classified regions of interest that contain the object of interest;
displaying the object of interest on a visualization map; and
automatically updating the visualization map to reflect a change in position of the object of interest.

2. The system as set forth in claim 1, wherein the one or more processors further perform operations of:
training the model with a set of labeled data points in the EO domain; and
adapting the trained model using a set of labeled data points in the SAR domain, where a number of data points in the set of labeled data points in the SAR domain is significantly fewer than a number of data points in the set of labeled data points in the EO domain.

3. The system as set forth in claim 2, wherein the set of labeled data points in the SAR domain and a set of unlabeled data points in the SAR domain are used to align an EO probability distribution and a SAR domain probability distribution.

4. A computer implemented method for transferring learned knowledge from an electro-optical (EO) domain to a synthetic-aperture-radar (SAR) domain, the method comprising an act of:
causing one or more processors to execute instructions encoded on a non-transitory computer-readable medium, such that upon execution, the one or more processors perform operations of:
using a measured similarity between the EO domain and the SAR domain, training a model for classifying SAR images using knowledge previously learned from the electro-optical (EO) domain,
wherein Sliced-Wasserstein Distance (SWD) is used to determine the measured similarity,
wherein SWD is used to minimize a discrepancy between an EO domain probability distribution and a SAR domain probability distribution in a latent space of a neural auto-encoder in order to supervise training of domain-specific encoders;
using the trained model, processing a SAR image to determine regions of interest in the SAR image;
classifying a region of interest to determine whether the region of interest corresponds to an object of interest;
outputting classified regions of interest that contain the object of interest;
displaying the object of interest on a visualization map; and
automatically updating the visualization map to reflect a change in position of the object of interest.

5. The method as set forth in claim 4, wherein the one or more processors further perform operations of:
training the model with a set of labeled data points in the EO domain; and
adapting the trained model using a set of labeled data points in the SAR domain, where a number of data points in the set of labeled data points in the SAR domain is significantly fewer than a number of data points in the set of labeled data points in the EO domain.

6. The method as set forth in claim 5, wherein the set of labeled data points in the SAR domain and a set of unlabeled data points in the SAR domain are used to align an EO probability distribution and a SAR domain probability distribution.

7. A computer program product for transferring learned knowledge from an electro-optical (EO) domain to a synthetic-aperture-radar (SAR) domain, the computer program product comprising:
computer-readable instructions stored on a non-transitory computer-readable medium that are executable by a computer having one or more processors for causing the processor to perform operations of:
using a measured similarity between the EO domain and the SAR domain, training a model for classifying SAR images using knowledge previously learned from the electro-optical (EO) domain,
wherein Sliced-Wasserstein Distance (SWD) is used to determine the measured similarity,
wherein SWD is used to minimize a discrepancy between an EO domain probability distribution and a SAR domain probability distribution in a latent space of a neural auto-encoder in order to supervise training of domain-specific encoders;
using the trained model, processing a SAR image to determine regions of interest in the SAR image;
classifying a region of interest to determine whether the region of interest corresponds to an object of interest;
outputting classified regions of interest that contain the object of interest;
displaying the object of interest on a visualization map; and
automatically updating the visualization map to reflect a change in position of the object of interest.

8. The computer program product as set forth in claim 7, further comprising instructions for causing the one or more processors to further perform operations of:
training the model with a set of labeled data points in the EO domain; and
adapting the trained model using a set of labeled data points in the SAR domain, where a number of data points in the set of labeled data points in the SAR domain is significantly fewer than a number of data points in the set of labeled data points in the EO domain.

9. The computer program product as set forth in claim 8, wherein the set of labeled data points in the SAR domain and a set of unlabeled data points in the SAR domain are used to align an EO probability distribution and a SAR domain probability distribution.

10. A system for transferring learned knowledge from an electro-optical (EO) domain to a synthetic-aperture-radar (SAR) domain, the system comprising:
one or more processors and a non-transitory computer-readable medium having executable instructions encoded thereon such that when executed, the one or more processors perform an operation of:
using a measured similarity between the EO domain and the SAR domain, training a model for classifying SAR images using knowledge previously learned from the electro-optical (EO) domain;
training the model with a set of labeled data points in the EO domain; and
adapting the trained model using a set of labeled data points in the SAR domain, where a number of data points in the set of labeled data points in the SAR domain is significantly fewer than a number of data points in the set of labeled data points in the EO domain,
wherein the set of labeled data points in the SAR domain and a set of unlabeled data points in the SAR domain are used to align an EO probability distribution and a SAR domain probability distribution;
using the trained model, processing a SAR image to determine regions of interest in the SAR image;
classifying a region of interest to determine whether the region of interest corresponds to an object of interest;
outputting classified regions of interest that contain the object of interest;
displaying the object of interest on a visualization map; and
automatically updating the visualization map to reflect a change in position of the object of interest.

11. The system as set forth in claim 10, wherein Sliced-Wasserstein Distance (SWD) is used to determine the measured similarity.

12. The system as set forth in claim 11, wherein SWD is used to minimize a discrepancy between an EO domain probability distribution and a SAR domain probability distribution in a latent space of a neural auto-encoder in order to supervise training of domain-specific encoders.

13. A computer implemented method for transferring learned knowledge from an electro-optical (EO) domain to a synthetic-aperture-radar (SAR) domain, the method comprising an act of:
causing one or more processors to execute instructions encoded on a non-transitory computer-readable medium, such that upon execution, the one or more processors perform operations of:
using a measured similarity between the EO domain and the SAR domain, training a model for classifying SAR images using knowledge previously learned from the electro-optical (EO) domain;
training the model with a set of labeled data points in the EO domain; and
adapting the trained model using a set of labeled data points in the SAR domain, where a number of data points in the set of labeled data points in the SAR domain is significantly fewer than a number of data points in the set of labeled data points in the EO domain,
wherein the set of labeled data points in the SAR domain and a set of unlabeled data points in the SAR domain are used to align an EO probability distribution and a SAR domain probability distribution;
using the trained model, processing a SAR image to determine regions of interest in the SAR image;
classifying a region of interest to determine whether the region of interest corresponds to an object of interest;
outputting classified regions of interest that contain the object of interest;
displaying the object of interest on a visualization map; and
automatically updating the visualization map to reflect a change in position of the object of interest.

14. The method as set forth in claim 13, wherein Sliced-Wasserstein Distance (SWD) is used to determine the measured similarity.

15. The method as set forth in claim 14, wherein SWD is used to minimize a discrepancy between an EO domain probability distribution and a SAR domain probability distribution in a latent space of a neural auto-encoder in order to supervise training of domain-specific encoders.

16. A computer program product for transferring learned knowledge from an electro-optical (EO) domain to a synthetic-aperture-radar (SAR) domain, the computer program product comprising:
computer-readable instructions stored on a non-transitory computer-readable medium that are executable by a computer having one or more processors for causing the processor to perform operations of:
using a measured similarity between the EO domain and the SAR domain, training a model for classifying SAR images using knowledge previously learned from the electro-optical (EO) domain;
training the model with a set of labeled data points in the EO domain; and
adapting the trained model using a set of labeled data points in the SAR domain, where a number of data points in the set of labeled data points in the SAR domain is significantly fewer than a number of data points in the set of labeled data points in the EO domain,
wherein the set of labeled data points in the SAR domain and a set of unlabeled data points in the SAR domain are used to align an EO probability distribution and a SAR domain probability distribution;
using the trained model, processing a SAR image to determine regions of interest in the SAR image;
classifying a region of interest to determine whether the region of interest corresponds to an object of interest;
outputting classified regions of interest that contain the object of interest;
displaying the object of interest on a visualization map; and
automatically updating the visualization map to reflect a change in position of the object of interest.

17. The computer program product as set forth in claim 16, wherein Sliced-Wasserstein Distance (SWD) is used to determine the measured similarity.

18. The computer program product as set forth in claim 17, wherein SWD is used to minimize a discrepancy between an EO domain probability distribution and a SAR domain probability distribution in a latent space of a neural auto-encoder in order to supervise training of domain-specific encoders.

* * * * *